E. L. CRONEMEYER.
AUTOMOBILE TOP.
APPLICATION FILED NOV. 12, 1919.
1,362,476.
Patented Dec. 14, 1920.
2 SHEETS—SHEET 1.
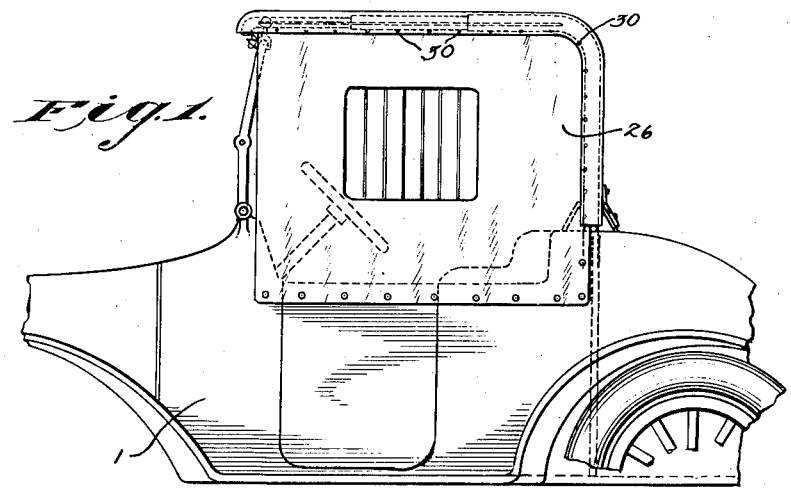
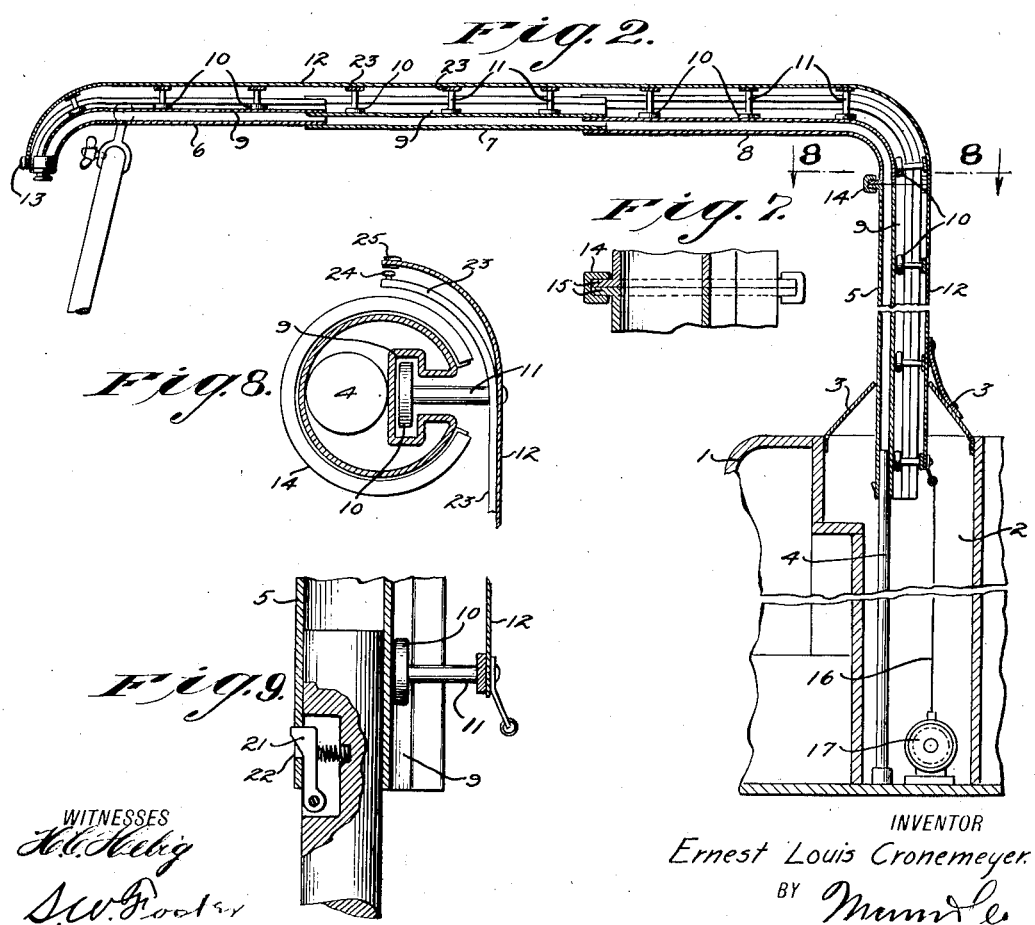
INVENTOR
Ernest Louis Cronemeyer.
BY
ATTORNEYS E. L. CRONEMEYER.
AUTOMOBILE TOP.
APPLICATION FILED NOV. 12, 1919.
1,362,476.
Patented Dec. 14, 1920.
2 SHEETS—SHEET 2.
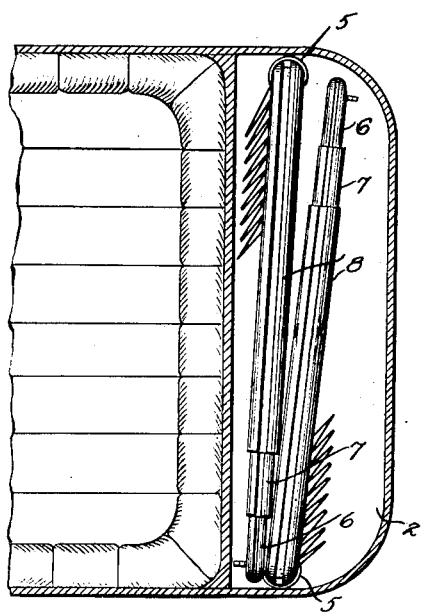
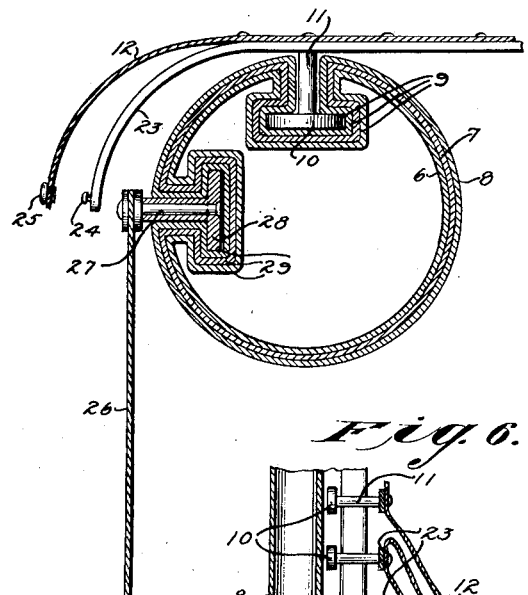
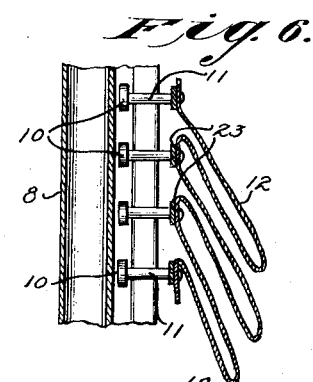
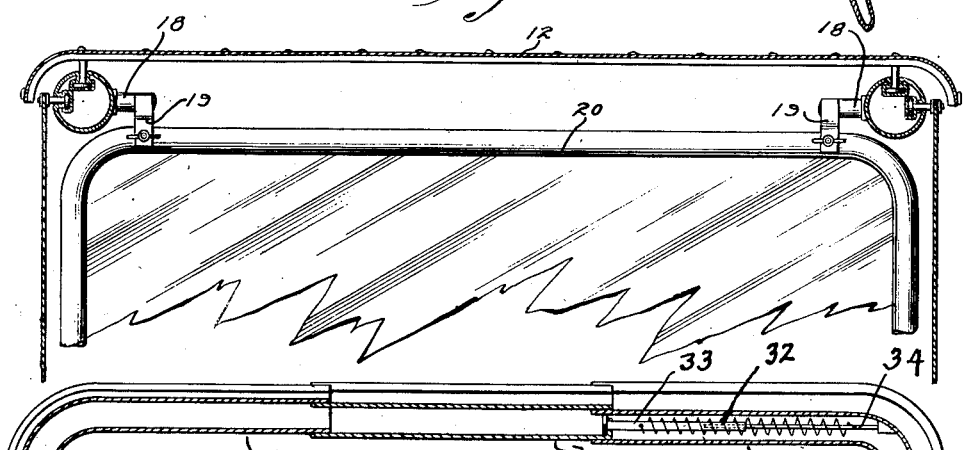
WITNESSES
INVENTOR
Ernest Louis Cronemeyer.
BY
ATTORNEYS

UNITED STATES PATENT OFFICE.

ERNEST LEWIS CRONEMEYER, OF REDLANDS, CALIFORNIA.

AUTOMOBILE-TOP.

1,362,476.

Specification of Letters Patent.  Patented Dec. 14, 1920.

Application filed November 12, 1919. Serial No. 337,436.

*To all whom it may concern:*

Be it known that I, ERNEST L. CRONEMEYER, a citizen of the United States, and a resident of the city of Redlands, in the county of San Bernardino and State of California, have invented a new and Improved Automobile-Top, of which the following is a full, clear, and exact description.

This invention relates to improvements in automobile tops, an object of the invention being to provide a top which is especially adapted for use on roadsters, touring cars, or other vehicles, also motor boats, and which can be easily and quickly operated by anyone, either to position the top in operation or telescope the same and house the top in a dust and waterproof compartment in the car body.

A further object is to provide a collapsible top of improved construction which will most efficiently protect the occupants of the car from the elements, which will be ornamental in appearance and which will not materially obstruct the view of the driver.

With these and other objects in view the invention consists in certain novel features of construction and combinations and arrangements of parts as will be more fully hereinafter described and pointed out in the claims.

In the accompanying drawings:—

Figure 1 is a view in side elevation illustrating my invention.

Fig. 2 is an enlarged view in longitudinal section through one of the telescoping tubular supports.

Fig. 3 is a fragmentary view in horizontal section.

Fig. 4 is a fragmentary view in transverse section taken through the top just in front of the wind shield.

Fig. 5 is an enlarged fragmentary view in transverse section through the tubular support and top.

Fig. 6 is a fragmentary view in vertical section showing the shape the cover assumes when collapsed.

Fig. 7 is an enlarged detail view showing the manner of connecting tube sections.

Fig. 8 is an enlarged view in section on the line 8—8 of Fig. 2.

Fig. 9 is a detail view illustrating the catch.

Fig. 10 is a view in longitudinal section showing the spring connection.

1 represents an automobile of the roadster type, although it is to be understood that my invention is not limited to any particular type of automobile.

A compartment 2 is provided in the rear of the automobile body, and this compartment is normally closed by hinged dust and waterproof covers 3.

Vertical posts 4 are secured in the compartment 2 and on these posts 4, tubular supports 5 are mounted. On the supports 5 are mounted any desired number of telescoping sections 6, 7 and 8, all of said sections having dovetailed alined grooves 9 to receive rollers 10 on studs 11 fixed to a flexible cover 12, and snap buttons 13 or other securing means connect the forward end of the cover with the forward ends of the forward tube sections.

The supports are shaped to give the desired shape to the top, and with this end in view the rear sections comprise elbows which may be in sections connected by split collars 14 engaging flanges 15 of the section as shown in Fig. 7 to permit a turning movement of its frames.

To hold the cover 12 taut, the rear end thereof may be connected by cords 16 with a spring roller 17, and to hold the frames against movement the forward ends thereof are provided with laterally projecting lugs 18 carrying clamps 19 to engage the wind shield 20.

To hold the supports in their elevated operative position the posts 4 are provided with spring-pressed catches 21 which spring into openings 22 in the supports as shown in Fig. 9 and these catches must be forced inwardly before the supports can be lowered.

The studs 11 above referred to, are preferably fixed to laterally projecting strips 23 attached to the lower face of the cover and these strips may be curved downwardly at their outer ends and provided with snap button members 24 to receive snap button members 25 on the cover to hold the latter in taut position thereon.

Side curtains 26 are connected to studs 27 carrying rollers 28 mounted in longitudinal dovetailed grooves 29 in the supports as shown in Fig. 5, and snap buttons or other securing devices 30 are provided to attach the edges of said side curtains to the body 1.

The top may have any desired number and arrangement of transparent sections 31.

To fold the top it is simply necessary to disconnect the clamps 19 and the snap buttons 24—25 and the snap buttons 13 and 30, when the sections of the supports will telescope rearwardly. They can then be turned to the position shown in Fig. 3 and lowered into the compartment 2 and be out of sight and protected from the elements when the covers 3 are in place.

It is apparent that variations in detail may be resorted to, to perfect the top and adapt the same to suit the varying tastes of the trade, but in all forms my improved telescoping supports with their mountings would be employed and hence the invention can be modified in many ways, the structure shown and described setting forth one example of my invention.

To exert a spring tension on the section I locate coiled springs 32 in the sections 8, positioned around a tube 33 and a rod 34 telescoping therein and secured to both. The rod 34 is secured to the section 8 and the tube 33 to the section 7. The springs will therefore hold the sections taut and prevent rattling.

Various slight changes might be made in the general form of the parts described without departing from my invention, and hence I do not limit myself to the precise details set forth but consider myself at liberty to make such slight changes and alterations as fairly fall within the spirit and scope of the appended claims.

I claim:

1. The combination with an automobile, of tubular telescoping supports thereon having longitudinal grooves therein, a cover, strips secured to the under face thereof, studs on the strips, devices on the studs movable in certain of said grooves, side curtains, devices on the side curtains movable in the other of said grooves, and vertical tubular sections movably secured to the telescoping sections.

2. The combination with a vehicle body having a compartment in its rear portion, of posts in the compartment, vertical tubular sections having rotary mounting on the posts, horizontal tubular telescoping sections having turning movement on the upper ends of said vertical sections, all of said sections having alined grooves therein, a cover, devices on the cover sliding in said grooves, means for securing the vertical sections at different elevations on the posts, and said horizontal sections adapted when the vertical sections are in their lowest positions to be swung transversely of the body and located in the compartment.

3. The combination with an automobile, of tubular telescoping supports thereon, having each a pair of longitudinal grooves therein, a cover, strips secured to the under face of the cover, studs on the strips, rollers on the studs, movable in certain of said grooves, side curtains, and rollers on the side curtains movable in the other of said grooves.

4. The combination with an automobile, of tubular telescoping supports thereon having longitudinal grooves therein, a cover, strips secured to the under face thereof, studs on the strips, rollers on the studs movable in certain of said grooves, side curtains, rollers on the side curtains in the other of said grooves, and vertical tubular sections movably secured to the telescoping sections.

ERNEST LEWIS CRONEMEYER.